United States Patent

[11] 3,590,934

| [72] | Inventors | Joachim Wappler<br>11 Clayhall Crescent, Downsview, Ontario;<br>Arno C. Schwarz, 55 Oakmount Road Apt.<br>1503, Toronto, 5 Ontario, both of, Canada |
|---|---|---|
| [21] | Appl. No. | 746,718 |
| [22] | Filed | June 10, 1968 |
| [45] | Patented | July 6, 1971 |

[54] CONTROL COLUMN FOR TERRAIN VEHICLE
10 Claims, 4 Drawing Figs.

[52] U.S. Cl. .................................................. 180/6.2, 180/77, 74/471
[51] Int. Cl. .................................................. B62d 11/08
[50] Field of Search .................................................. 180/6.2, 6.48, 6.66, 6.7, 77, 77 H; 188/16; 74/471, 471 XY

[56] References Cited
UNITED STATES PATENTS

| 3,263,763 | 8/1966 | Adams ........................ | 180/6.2 |
| 1,928,915 | 10/1933 | Stout ........................... | 180/77 (H) |
| 2,176,170 | 10/1939 | Flowers ....................... | 180/77 (H) X |
| 2,479,830 | 8/1949 | Goepfrich .................... | 188/16 |
| 3,180,305 | 4/1965 | Gower-Rempel ............ | 180/6.48 X |
| 3,323,607 | 6/1967 | Futamata ..................... | 180/6.48 |

FOREIGN PATENTS

| 755,913 | 4/1967 | Canada ........................ | 180/6.2 |
| 1,124,637 | 7/1956 | France ......................... | 180/6.2 |
| 309,470 | 4/1929 | Great Britain ............... | 188/16 |

*Primary Examiner*—Benjamin Hersh
*Assistant Examiner*—John A. Pekar
*Attorney*—George A. Rolston

ABSTRACT: A single control stick for a motor-driven vehicle with wheels pivotally mounted on a locating means for movement in two planes of movement, a first plane of movement along the longitudinal axis to provide accelerating action or braking action, a second plane of movement normal to the first plane for steering action which is done by braking the wheels separately.

PATENTED JUL 6 1971 3,590,934

INVENTORS
JOACHIM WAPPLER
ARNO C. SCHWARZ
BY *George A. Rolston*

CONTROL COLUMN FOR TERRAIN VEHICLE

This invention relates to a vehicle of the type which is capable of propelling itself over land of any type and water and more particularly to a single stick control system which is used for braking, steering, throttling and effecting variations in the power transmitted to the wheels of the vehicle and the speed of rotation of the wheels.

It is an object of this invention to provide a single stick control system for a vehicle which is extremely light in weight and easy to handle by an operator having two planes of motion for complete vehicle control.

It is also an object of this invention to provide a single stick control system for a vehicle which is simple in construction and easy to manufacture.

It is another object of this invention to provide a single control stick system for use with the motor driven vehicle which is adapted to control braking, steering, throttling, effecting variations in the power transmitted to the wheels of the vehicle and the speed of rotation of the wheels.

One example of this type of vehicle has a control system for use with driving means in the vehicle comprising a single rod pivotally mounted at a pivot axis adjacent one end of the rod, and hand grip control rods extending on either side of said rod rotatably mounted therein connected to centrifugal clutches for controlling either one or two internal combustion engines. To steer or stop the vehicle it is often necessary to declutch one of the centrifugal clutches associated with one of the motors or both of them at the same time. To steer the vehicle the rod must be moved backwards and forwards and to control the engine throttle control cable the hand grip control rods must be turned.

This invention provides a control system for use with a motor-driven vehicle which is simple to operate. Centrifugal clutches are omitted from this control system as the operator steers the vehicle as a tank is steered by applying braking means to one set of wheels on one side of the vehicle slowing them down while the set of wheels on the other side continue to operate at their regular speed. Preferably the single stick control system will be used in conjunction with a novel braking and steering system which will permit the operator of the vehicle to operate the control system with only one hand on the control stick for all necessary controls of the vehicle.

There are two planes of motion for complete vehicle control. A first plane of movement parallel to the longitudinal axis of the vehicle for providing acceleration action in a forward position and braking action in a backward position with a neutral position therebetween. A second plane of movement normal to the first plane to provide steering action to either side of the vehicle. Movement in the first plane does not prevent movement of the control stick in the second plane, if desired. The control stick is operatively connected to a return spring means which requires the operator to hold the control stick in the forward position to accelerate the vehicle. The control stick will tend to slip backwards towards the neutral position if the hand of the operator is disengaged from the stick, slowing down the vehicle which eventually stops.

The control stick is pivoted backwards on a movable mounting means secured in the vehicle to apply joint brake operating means for braking the wheels of the vehicle. A releasable positional locking means on said mounting means prevents the control stick from rotating back towards the neutral position so that, once the brakes are applied the operator will be certain the vehicle will stop.

When the operator wishes to steer the vehicle either to the left or to the right, the operator will swing the control stick in the direction he wishes to travel which will cause the vehicle to turn in that direction. As the steering is done by braking only, the operator will be using the braking system on the wheels on the one side only while the wheels on the other side will be permitted to run at their full speed. As the speed of the vehicle increases it will become more difficult to oversteer at high speeds.

The foregoing and other advantages will become apparent from the following description of a preferred embodiment of the invention which is here given by way of example only with reference to the following drawings, in which like reference devices refer to like parts thereof through the various views and diagrams, and in which.

Figure 1:
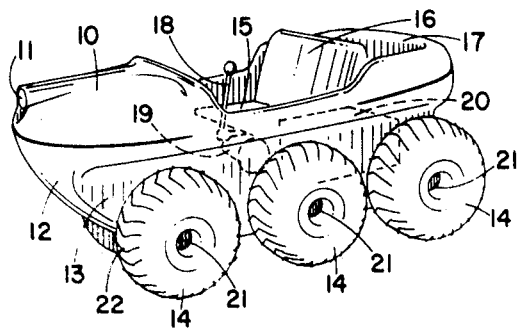
FIG. 1 is a perspective view of a vehicle embodying the invention.

FIG. 1 illustrates a vehicle embodying the invention, it will be seen that the vehicle has a body 10 with a headlight 11 and an undercarriage 12 having channels 13 on either side thereof in which wheels 14 are positioned. Preferably three wheels 14 are rotatably associated with the body 10 on each side thereof. The body may be made of any suitable light strong material, preferably fiberglass. Provided in the body 10 is a seat 15 for the operator, with a back 16 and a deck 17 wherein anything can be stored. A control stick 18 is provided for the operator to steer and brake the vehicle and is connected to a control system which will be hereinafter described. An internal combustion engine 19 and drive means 20 are housed in the body 10, engine 19 and drive means 20 being shown in dotted lines located under the seat 15. The wheels 14 are mounted on axles 21 and are provided with raised lugs 22 which assist in providing a grip between the wheels 14 and the land over which the vehicle is travelling. There is no type of suspension system provided as a need for such a system is removed by employing wheels 14 which are of a low-pressure type.

The single stick control system is preferably used with a braking and steering system where both systems use the same brakes. The braking system on both sides of the vehicle is operated in unison for braking the vehicle whereas the braking system on either side is used selectively for steering the vehicle as in a tank or tracked vehicle.

Figure 2:
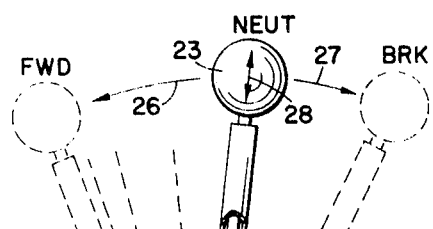
FIG. 2 shows an elevation view, partly in section, of a control stick moving in one plane of motion between a forward position, a neutral position, and a braking position.
Figure 4:
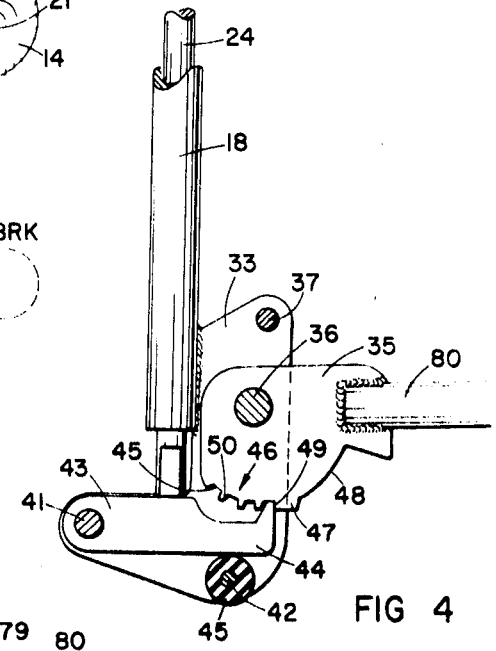

The operator of the vehicle will normally hold onto the control stick 18 which is hollow preferably by means of a headpiece 23. The headpiece 23 is secured to one end of a rod 24 that passes inside the control stick 18. In one plane of motion the control stick 18 will have three positions as shown in FIG. 2, a neutral (NEUT), forward (FWD) and braking (BRK) position. When the control stick 18 is in the neutral position, as shown in solid outline in FIG. 2, the engine 19 will idle and the vehicle will not accelerate forward. To reach the forward direction, the control stick 18 is drawn in the direction shown by an arrow 26, while to reach the braking position, the control stick 18 is drawn in the direction shown by an arrow 27. The headpiece 23 itself can be moved in the direction shown by an arrow 28 to move the control stick 18 from the braking or neutral position to the forward position.

Figure 3:
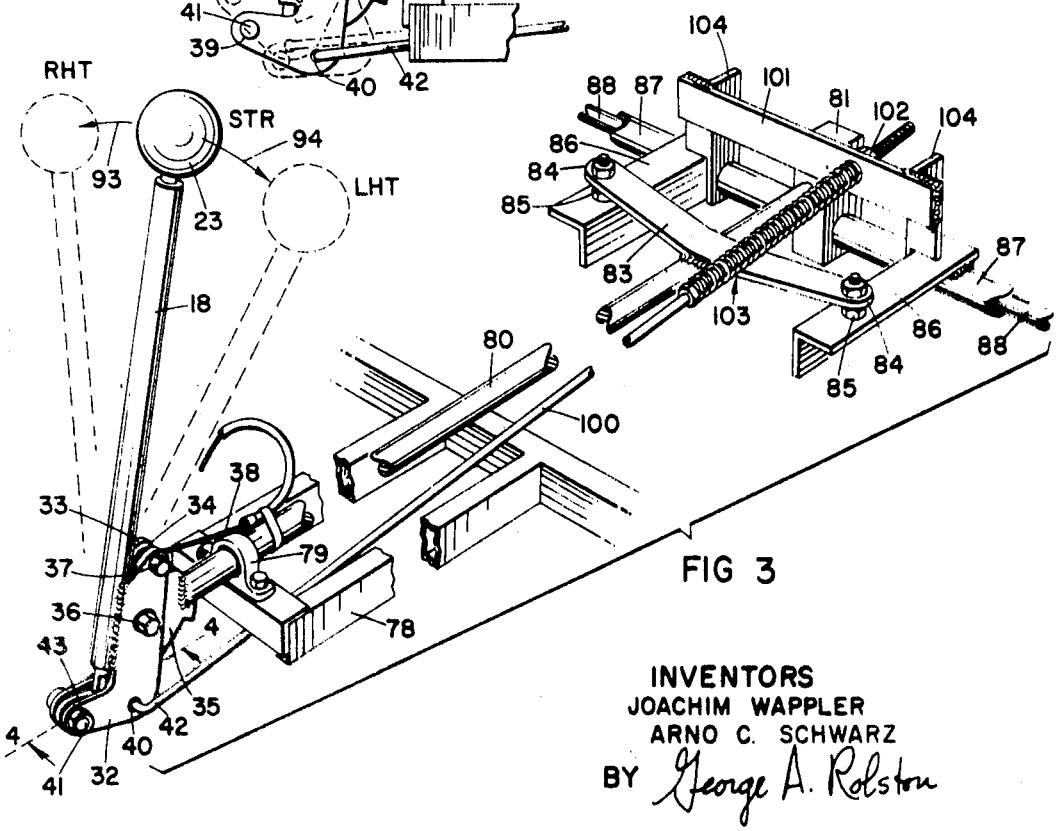
FIG. 3 is a perspective view showing a control system of this invention in association with a braking and steering mechanism for a vehicle and the control stick in the second plane of motion for steering the vehicle; and, FIG. 4 shows a sectional view along the line 4-4 in FIG. 3.

In FIG. 3 is shown a perspective view of the control system in use with a braking and steering mechanism. The control stick 18 is secured at its lower end to a first and second spaced apart L-shaped support member 32 and 33 respectively, with a space 34 therebetween. A ratchet mechanism 35 welded on a rod 80 is inserted in the space 34 and a nut and bolt combination 36 is passed through holes provided in the support members 32 and 33 also in the ratchet mechanism 35 to provide a pivot axis for the control stick 18. In the upper portions of the support members 32 and 33 are provided suitable holes for a nut and bolt combination 37 to which an engine throttle cable 38 is connected. In the lower portions of the support members 32 and 33 are two holes 39 and 40 (shown best in FIG. 2) through which pass a nut and bolt combination 41 and an end portion 42 of a braking rod 100 respectively. The nut-and-bolt combination 41 provides a pivot axis for a movable arm 43 which has a free end 44 shaped like a hook portion, the arm 43 is of such a width that it can fit in the space 34 and of a length which has its free end 44 extending past the end portion 42 of the braking rod. A piece of pliable rubber 45 is positioned between the free end 44 and the braking rod means 42 and provides a resilient pad which forces the hook portion 44 of the extension arm 43 into engagement with the bottom edge 25 of the ratchet mechanism 35.

The headpiece 23 is secured to one end of the rod 24 passing through the control stick 18 whereas the other end of the rod 24 is positioned over the extension arm 43 so that when the headpiece 23 is pushed downward in the direction illustrated by arrow 28 the hook portion 44 is forced out of the tooth portion 46 and against the rubber 45 permitting the operator to rotate the control stick 18 about its pivot axis in the desired direction.

When the control stick 18 is moved forward the hook portion 44 is moved past a projecting portion 47 and makes contact with a diverging edge 48 of the ratchet mechanism 35. The edge 48 has no tooth portions and the operator must hold the control stick 18 in the forward position to keep the vehicle moving forward. If the operator removes his hand from the control stick 18, the control stick 18 will tend to move backwards towards the neutral position slowing down the vehicle.

To brake the vehicle, the operator draws the control stick 18 backwards, as indicated by arrow 27, and the hook portion 44 rotates past the projection portion 47 into the tooth portion 46 of the ratchet mechanism 35. The hook portion 44 will be engaged in a tooth portion preventing the hook portion 44 from moving back towards the projecting portion 47. Each tooth of the tooth portion 46 has a straight edge 49 against which the upper portion of the hooked portion 44 rests and a diverging edge 50 slanted in a forward direction. If the operator pulls the control stick 18 back further the hook portion 44 will move to another tooth ahead of it but will not go backwards towards the projecting portion 47 without the headpiece 23 being pushed down.

Also in FIG. 3 is illustrated part of the steering and braking mechanism used with the drive means 20 which comprises a steering control rod 80 connected between the stick control 18 and a post 81 to which the rod 80 is secured by a nut (not shown). The rod 80 is securely held in a rotatable bearing 79 bolted to a frame member 78 so that the steering rod 80 can be swung in a clockwise or counterclockwise direction only. At the end of the rod 80 near the post 81 is a yoke 83 which is preferably a flat plate with a midportion being welded to the rod 80. At the free ends 84 of the plate are holes for a nut and bolt combination 85 to pass therethrough. The plate 83 is shaped to position the nut-and-bolt combination 85 over the horizontal angle irons 86 which are connected to the braking system (not shown). Each horizontal angle iron 86 is positioned perpendicular to and welded on a sleeve 87 which is fitted upon a rigid rod 88 securely held between frame members (not shown).

It will be understood that the braking system is not shown as being no part of the present invention, but such a system will normally comprise any suitable braking means capable of being operated either in unison for retarding the vehicle, or selectively one on or other side for steering the vehicle, such operations being achieved through means such as angle irons 86 in this preferred embodiment.

To steer the vehicle to the left (LHT) or to the right (RHT) (as shown in dotted outline in FIG. 3) by arrows 94 and 93 respectively, the steering control rod 80 is swung in that direction forcing the nut and bolt combination 85 against the horizontal angle iron 86 on that side applying the braking system (not shown) to the wheels on that side of the vehicle.

A brake control rod 100 is connected between the control stick 18 and a flat plate 101 welded to vertical angle irons 104 at its ends. The angle irons 104 have aligned holes in their lower portions through which the sleeve 87 passes. The brake rod 100 is connected to the plate 101 by a nut 102 on one side and a spring and bolt combination 103 in front of the plate to hold the plate 101 in a normal position resting against the post 81 when the brakes are not applied. The plate 101 and the vertical angle irons 104 are pulled forward by the brake rod 100 when the operator pulls the control stick 18 backwards applying the braking system on both sides of the vehicle.

In operation, the single stick control system operates in conjunction with braking and steering mechanism in such a way that the control stick 18 has two planes of motion. In one plane, shown in FIG. 2, the control stick 18 is swung from a neutral position to either a forward accelerating position or a braking position. When the operator wishes to draw the control stick 18 forward the headpiece 23 must be depressed so that the hook portion 44 of the extension arm 43 will be free of the toothed portion 46 of the ratchet mechanism 35 permitting the control stick 18 to be rotated in the direction of the arrow 26. The effective length of the throttle cable 38 is increased making the engine 19 accelerate moving the vehicle straight ahead.

To brake the vehicle, the operator pulls backward on the control stick 18 in the direction indicated by the arrow 27 the effective length of the throttle cable 38 is decreased slowing down the engine 19 while the braking rod 100 is drawn forward causing the plate 101 and the attached vertical angle irons 104 engaging the horizontal angle irons 86 on both sides of the vehicle to operate both braking systems in unison. In the braking position the hook portion 44 of the extension arm 43 will remain in contact with the toothed portion 46 on the ratchet mechanism 35 until the operator desired to return the control stick 18 to the neutral or to the forward position.

The control stick 18 is swung selectively either to the left or to the right in the second plane of motion for steering the vehicle in that direction. As control stick 18 is rotated in the desired direction the ratchet mechanism 35 which is securely attached to the support members 32 and 33 by the nut and bolt combination 36 is also rotated in that direction. This causes the steering rod 80 to rotate and one of the nut and bolt combinations 85 will engage either of the horizontal angle irons 86 but not both of them at the same time. The braking means of the vehicle will be applied to the set of wheels on the one side slowing those wheels down whereas the wheels on the other side of the vehicle continue to operate at their regular speed. The operator thus will be able to turn the vehicle in either desired direction.

There are two planes of motion for complete vehicle control and this requires coordination to regulate the speed and steering simultaneously. There may be a problem maintaining a specified distance between the operating vehicle and a lead vehicle where visual perception of the operator is not sufficient to maintain that distance. The operator may find it more convenient to have the engine throttle cable 38 disconnected from the control stick 18 and connected to a pedal in the vehicle which can be operated by the foot of the operator. This would permit the operator to control the acceleration and braking of the vehicle by different means more easily maintain a specified distance between operating vehicles.

The foregoing is a description of a preferred embodiment of the invention which is here made by way of example only and the invention is not to be construed as limited to any of the specific features described.

What we claim is:

1. A control stick system for use in association with a motor driven vehicle having driven wheels on each side and separate brake means for said driven wheels on each side and joint brake operating means for braking said vehicle and selective braking operating means for steering the same, and motor speed control means for controlling the speed of said vehicle, said control system comprising:

movable control stick mounting means adapted to be secured in said vehicle and supporting said control stick for swinging from side to side with respect to an intermediate central position in a first plane of movement, transversely of said vehicle;

a control stick pivotally mounted on said mounting means for swinging forward and rearward with respect to an intermediate neutral position in a second plane of movement arranged and oriented to be parallel to the longitudinal axis of said vehicle;

joint brake operating connection means adapted to be connected to said joint brake operating means and operatively connected to said control stick and responsive to movement thereof in one direction away from said neutral position in said second plane to operate said brakes in unison;

selective brake-operating connection means adapted to be connected to said selective brake operating means and operatively connected to said control stick and responsive to transverse movement thereof away from said central position in said first plane to operate a respective one of said brake means selectively, and, motor speed control connection means adapted to be connected to said motor speed control means and operatively connected to said control stick and responsive to movement thereof in said second plane in the opposite direction away from said neutral position to accelerate said motor.

2. The control system, as described in claim 1, wherein control stick movement in said second plane of movement for braking or accelerating action may occur while said control stick is being swung in said first plane of movement for steering.

3. The control system, as described in claim 1, including a releasable control stick positional locking means on said mounting means operatively associated with said control stick to engage and lock the same in at least one predetermined position in said first plane of control stick movement.

4. The control system, as described in claim 3, including return spring means connected to said joint and selective brake operating connection means and operatively connected to said control stick to urge said control stick towards said neutral position in said second plane.

5. The control system as claimed in claim 3 wherein said releaseable control stick positional locking means includes a locking plate member attached to said selective brake-operating means, attachment bracket means fastened to the lower end of said control stick, and pivotally mounted on said locking plate member for swinging to and fro in said second plane of movement, locking detent means on said locking plate in predetermined orientation in relation to the forward and rearward position of said control stick, a locking member movably mounted on said support bracket means, and releaseably interengageable therewith, while said control stick is moved in said second plane away from said neutral position in the direction of movement thereof corresponding to operation of said joint brake operating means, movement of said control stick in said second plane, in said opposite direction away from said neutral position, being free of interlocking engagement between said detent and said locking member, and manually operable locking member release means arranged at the upper end of said control stick for manually releasing said locking member from said detent means.

6. The control system as claimed in claim 5 including resilient biassing means engaging said locking member and operatively urging said locking member into engagement with said detent means, said manually operable release means being arranged to be operable to overcome said biassing means and release said locking means from said detent means as aforesaid.

7. A control system as claimed in claim 1 wherein said control stick mounting means includes a shaft member arranged parallel to the longitudinal axis of the vehicle, bearing means rotatably mounting said shaft member therein, mounting plate means on said shaft member, and control stick pivot means on said mounting plate means, said control stick being pivotally connected thereto.

8. A control system as claimed in claim 7 wherein said control stick includes pivot plate means adjacent one end thereof, the other end of said stick being free to be grasped by an operator, said pivot plate means being shaped and oriented to engage said mounting plate means on said shaft member to transmit transverse swinging of said stick in said first plane and causing semirotary movement of said shaft member and being pivotally connected to said pivot means as aforesaid.

9. A control system as claimed in claim 8 wherein said joint brake operating connection means includes brake control rod means having one end connected to said pivot plate means for movement in unison therewith in response to swinging of said stick in said second plane, and having its other end connected to said joint brake operating means.

10. A control system as claimed in claim 7 wherein said selective brake operating connection means include yoke means mounted on said shaft member and extending on either side thereof for semirotary movement in unison therewith.